Dec. 30, 1952          C. W. EVANS          2,623,447
TRACTOR MOUNTED TWO-WAY PLOW

Filed Sept. 19, 1950          3 Sheets—Sheet 1

Inventor
CHARLES WILLIAM EVANS
By
Attorney

Dec. 30, 1952  C. W. EVANS  2,623,447
TRACTOR MOUNTED TWO-WAY PLOW
Filed Sept. 19, 1950  3 Sheets-Sheet 3

Inventor
CHARLES WILLIAM EVANS
By
Attorney

Patented Dec. 30, 1952

2,623,447

UNITED STATES PATENT OFFICE 2,623,447

TRACTOR MOUNTED TWO-WAY PLOW

Charles William Evans, Southport, England

Application September 19, 1950, Serial No. 185,529
In Great Britain September 26, 1949

17 Claims. (Cl. 97—29)

The present invention relates to ploughs.

One feature of the present invention consists in mounting the ploughshare and mould-board (hereinafter referred to collectively as the ploughshare) on an upwardly extending stalk or standard which is upwardly and downwardly displaceable in a guide on the frame of the plough so that the ploughshare can be raised and lowered relatively to the frame and thus relatively to the ground.

The invention is especially applicable to a two-way plough having ploughshares of opposite hand which can be brought into and out of operation alternately to lay, for example, one furrow to the right when ploughing in one direction and then to lay the next furrow to the left when ploughing in the opposite direction.

Thus a further feature of the invention consists in a two-way plough in which two upwardly extending ploughshare supporting stalks or standards are arranged one on each side of a plough frame and are upwardly and downwardly displaceable in guides on the frame so that one can be raised as the other is lowered and vice-versa.

A further feature of the invention consists in balancing the ploughshares and their supporting stalks or standards against one another by means of a balance beam pivoted to the frame.

Thus the invention includes a two-way plough in which two upwardly extending ploughshare supporting stalks or standards respectively supporting ploughshares of opposite hand and arranged on opposite sides of a plough frame are interconnected by a balance beam pivoted to the frame, and are upwardly and downwardly displaceable in guides on the frame so that one can be raised relatively to the frame as the other is lowered and vice-versa by angular displacement of the balance beam.

A further feature of the invention consists of a plough frame including a longitudinal central beam with a cross beam secured thereto and with guides for said stalks secured at opposite ends of the cross beam, both of said beams being preferably of box section and said stalks being of square or rectangular section and being received in guides of box-like form.

The frame preferably has a cross beam of box-like section at each end thereof and upstanding posts of box section extending upwardly therefrom at or near the forward and rearward ends thereof. The balance beam may be pivoted to the rearmost post whilst an auxiliary balance beam may be pivoted to the foremost post for the raising and lowering of disc coulters located one on each side of the frame. A common control means may be provided for raising and lowering the ploughshares and the disc coulters.

The invention is further described with reference to the accompanying drawings which illustrate one form of construction of the invention by way of example and in which:

Fig. 1A is a fragmentary view showing the upper portion of the lever and power lift connection shown in Fig. 1.

Figure 1:
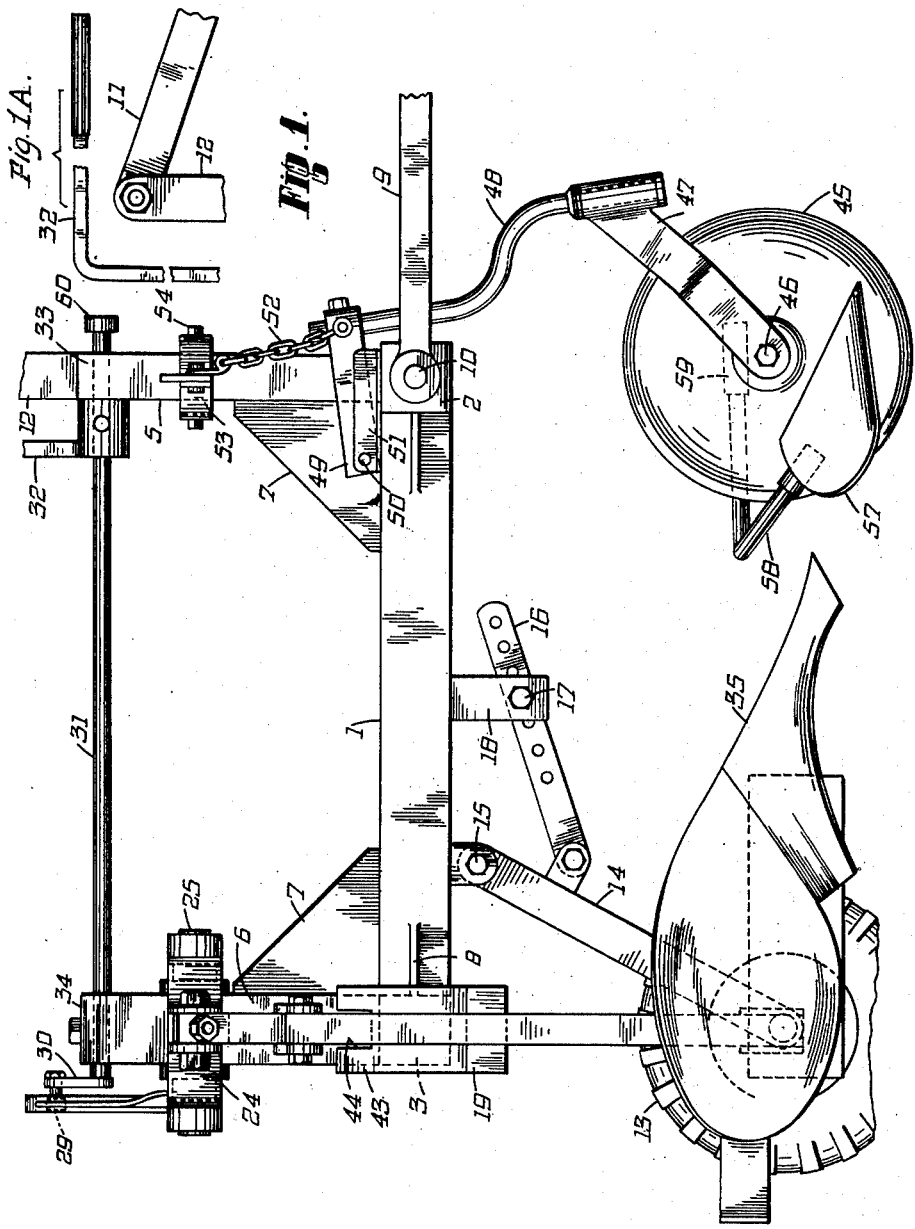
Fig. 1 is a side elevation.

The frame of the plough consists of a longitudinal beam 1 of box section, forward and rear cross beams 2, 3, also of box section and upstanding posts 5, 6 of box section. Reinforcing gusset plates 7, 8 are welded to the longitudinal beam 1 and to the posts and cross beams respectively.

The frame has towing links 9 at each side thereof, pivoted at 10 to the outer ends of the forward cross beam 2, and a power lift connection 11, 12 is provided at the upper end of the forward post 5. The parts 11, 12 of the power lift connection are relatively angularly fixed except for adjustment purposes so that clockwise angular displacement of the part 11 will raise the plough from the ground when it is desired for example to transport the plough along a road by means of a tractor.

The height of the frame above the ground, and thus the ploughing depth is controlled by means of a rear wheel 13 mounted in a fork 14 pivoted at its upper end 15 to the frame and whose angularity can be adjusted by an apertured link 16 which is adjustably connected through a bolt 17 to a lug 18 depending from the beam 1.

Figure 2:
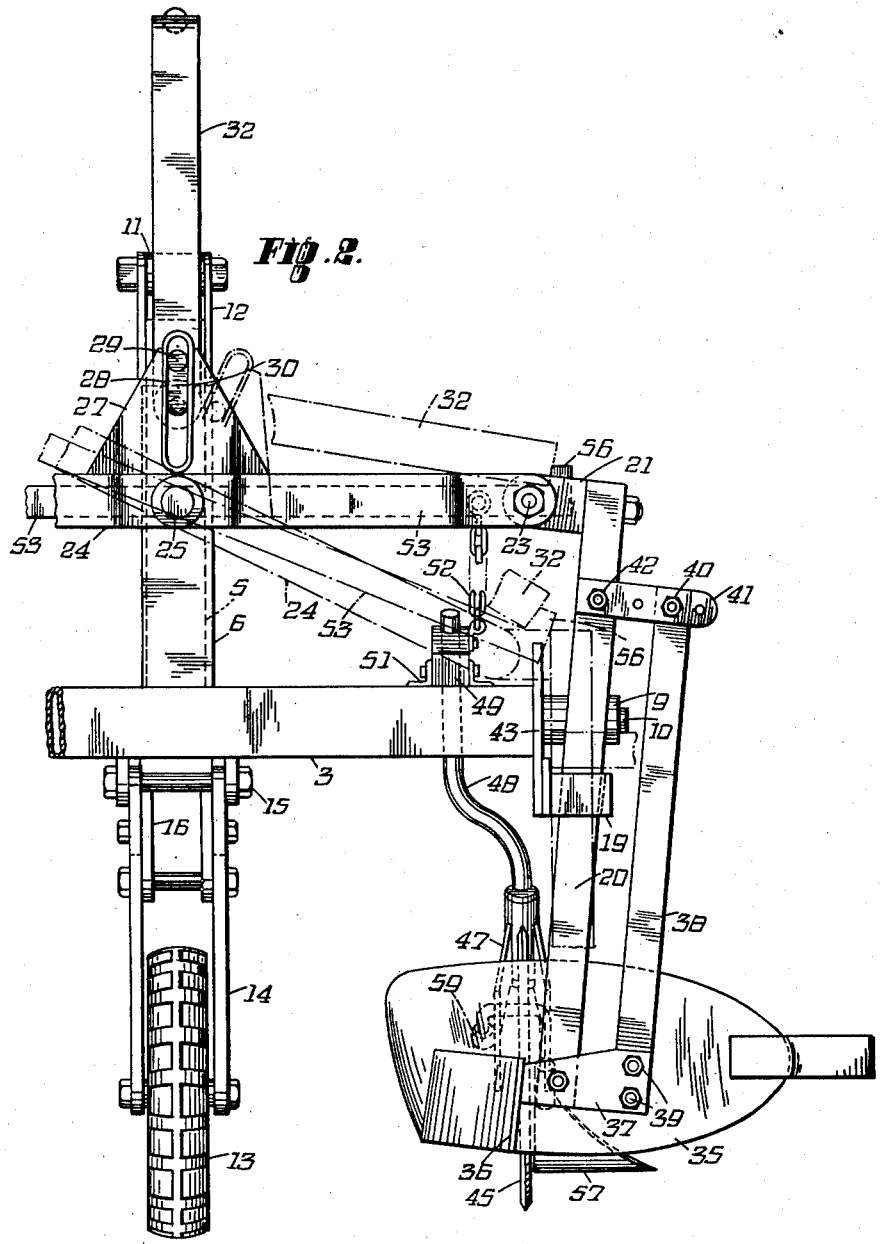
Fig. 2 is a fragmentary end elevation taken from the left hand end of Fig. 1.
Figure 3:
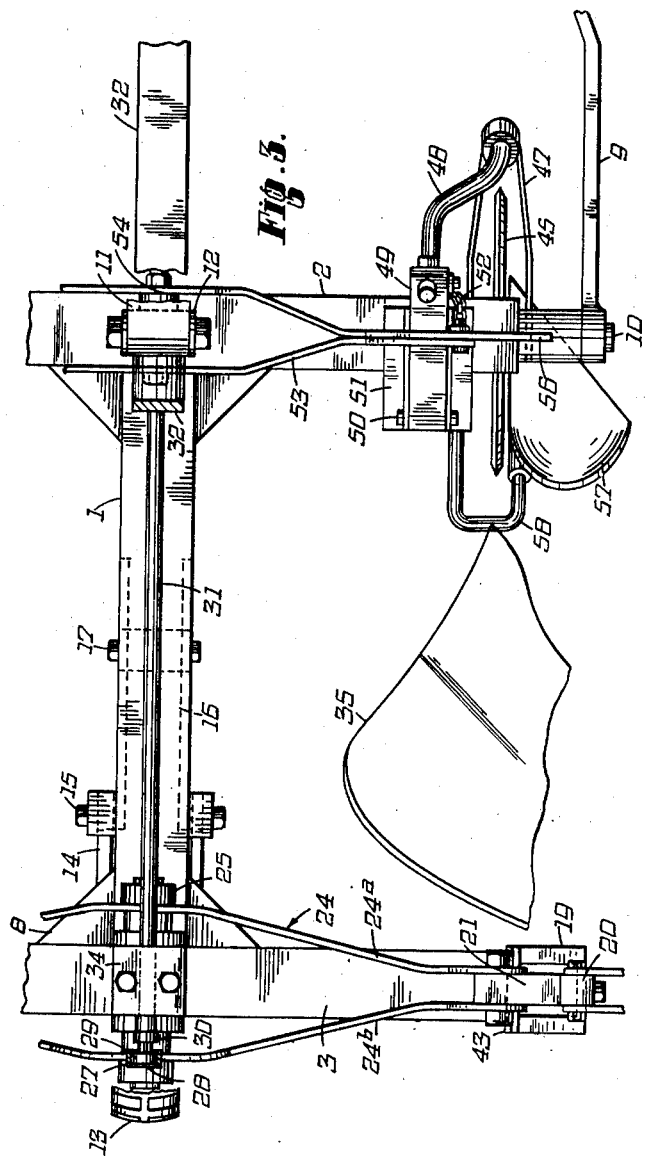
Fig. 3 is a fragmentary plan view.

At each end of the rear cross beam 3 there is a guide 19 of box section in which is received a ploughshare supporting stalk or standard 20. The stalk 20 can be raised and lowered relatively to the guide 19 and is capable of a small degree of angular movement in a transverse plane i. e. it is capable of a small degree of clockwise and counterclockwise angular displacement as viewed in Fig. 2. A pivot lug 21 extends inwardly from the upper end of each stalk 20 and is pivoted at 23 to the end of a balance beam 24. The balance beam is formed of a pair of beam elements 24a, 24b as will be seen in Fig. 3 and at its mid-length is pivoted at 25 on opposite sides of the rear post 6. A triangular plate or plate-like lever 27 having a slot 28 therein is secured to the mid-length of the balance beam 24 to receive a pin 29 at the end of a reversing crank 30 which is secured to a reversing spindle 31 operated by a reversing lever 32. The reversing spindle 31 is journalled at 33 and 34 on the upper ends of the posts 5 and 6. In Figure 2 the reversing lever 32 is shown in full lines in its neutral or mid position and one of its terminal positions is indicated fragmentarily in broken lines in Figure 2. The balance beam 24 and the stalk 20 are shown in Figure 2 in their mid-positions to correspond to the position of the reversing lever 32. If the lever 32 is turned in a clockwise direction to bring it into the position shown in broken lines in Fig. 2 then the balance beam 24 will move in a clockwise direction to lower the right-hand stalk 20 and to bring the ploughshare 35 attached thereto into an operative position. By movement of the reversing lever 32 in a counterclockwise direction the right-hand ploughshare 35 will be raised into its inoperative position and the left-hand ploughshare moved downwardly to its operative position. The ploughshare 35 is shown in Fig. 2 in a neutral position in which both ploughshares will be raised from the ground to enable the plough to be towed inoperatively.

The ploughshare 35 is secured at 36 to a short lever 37 pivoted to the stalk 20. An arm 38 is fixedly connected by bolts 39 to lever 37 and at its upper end is adjustably connected by a bolt 40 to an apertured link 41 secured at 42 to the stalk 20. By connecting the upper end of the arm 38 more closely to or more distantly from the stalk 20 it is possible to adjust the angular position of the ploughshare 35 about a longitudinal axis relatively to the stalk 20 appropriately for different depths of cut.

Each box guide 19 is secured to the end of the cross beam 3 by means of an upwardly extending plate 43. The upper end of the plate 43 is slotted at 44 as shown in Fig. 1 to enable it to receive the pivot lug 21 at the upper end of the stalk 20 when the stalk 20 is in its lowermost position ready for ploughing. The engagement of the lug 21 in the slot 44 together with the engagement of the stalk in the box guide 19 provides a resisting moment to sustain the turning moment applied to the stalk when the ploughshare is ploughing.

The box guide 19 has a bolt and nut connection to the cross beam 3, which connection is adequate to sustain the forces which arise in normal ploughing but insufficient to sustain the forces which might arise if the ploughshare encounters a serious obstruction. In such an event the box guide connection would yield, whereby to avoid serious damage to the ploughshare or frame which would be more costly to repair than the damage caused to the said connection.

A disc coulter 45 is provided on each side of the longitudinal beam 1. Each disc coulter is mounted on a spindle 46 extending across the end of a fork 47 pivoted at its forward end to the lower end of a depending cranked arm 48 mounted at its upper end in the forward end of a block 49 pivoted at its rearward end 50 to the rearward end of a pair of channels 51 secured to the upper surface of the forward cross beam 2. The forward end of each block 49 is connected through a chain 52 to an auxiliary balance beam 53 pivoted at 54 to the forward post 5. The auxiliary balance beam 53 has at each end thereof an upstanding lug 56 adapted for engagement with the end of the reversing lever 32. Thus as the reversing lever is moved away from one of its terminal positions it comes into engagement with the end of the auxiliary balance beam 53 as it approaches its other terminal position so as to reverse the auxiliary balance beam and thereby to raise one disc coulter and allow the other to fall into its operative position.

A skim coulter 57 (one at each side of the frame) is mounted on a cranked arm 58 connected at 59 to the inside leg of the fork 47.

The reversing spindle 31 is capable of a certain degree of longitudinal displacement which is limited by a collar 60 at the forward end thereof and by the boss of the crank 30 at the rearward end thereof. The crank 30 is formed so that it can fit into the slot 28 of the plate 27 so that when the balance beam 24 is in its horizontal position the reversing spindle 31 can be moved rearwardly to bring the crank 30 into the slot 28 of the plate 27 whereby to lock the balance beam 24 in its horizontal position.

I claim:

1. A two-way plough comprising a plough frame embodying a longitudinal central beam with a cross beam secured thereto, upwardly and downwardly directed guides one at each end of said cross beam, two upwardly extending ploughshare supporting stalks slidable respectively in said guides in an upward and downward direction, ploughshares of opposite hand secured to the lower ends of said stalks, a transverse balance beam pivoted to the frame and pivotally connected to said stalks so that one of said stalks can be raised as the the other is lowered and vice-versa by angular displacement of the balance beam, and means enabling a towing connection and a power lift connection to be made between said longitudinal central beam and an agricultural tractor.

2. A two-way plough comprising a plough frame embodying a box-section longitudinal central beam and a box-section cross beam secured thereto, upwardly and downwardly directed box-like guides one at each end of said cross beam, two upwardly extending ploughshare supporting stalks of rectangular cross-section slidable respectively in said guides in an upward and downward direction, ploughshares of opposite hand secured to the lower ends of said stalks, a transverse balance beam pivoted to the frame and pivotally connected to said stalks so that one of said stalks can be raised as the other is lowered and vice-versa by angular displacement of the balance beam, and means enabling a towing connection and a power lift connection to be made between said longitudinal central beam and cross beam and an agricultural tractor.

3. A two-way plough comprising a plough frame embodying a longitudinal central beam, a cross beam secured thereto and a post rising therefrom, upwardly and downwardly directed guides mounted one on each end of said cross beam, two upwardly extending ploughshare supporting stalks slidable respectively in said guides in an upward and downward direction, ploughshares of opposite hand secured to the lower ends of said stalks, a transverse balance beam pivoted to said post and pivotally connected to said stalks on opposite sides of said post so that one of said stalks can be raised as the other is lowered and vice-versa by angular displacement of the balance beam, and means enabling a three point linkage, providing a combined towing and power lift connection, to be made between the cross beam and post and an agricultural tractor.

4. A two-way plough comprising a plough frame embodying a longitudinal central beam of box-section, a box-section cross beam secured thereto and a box-section post rising therefrom, upwardly and downwardly directed guides mounted one on each end of said cross beam, two upwardly extending ploughshare supporting stalks slidable respectively in said guides in an upward and downward direction, ploughshares of opposite hand secured to the lower ends of said stalks, a transverse balance beam pivoted to said post and pivotally connected to said stalks on opposite sides of said post so that one of said stalks can be raised as the other is lowered and vice-versa by angular displacement of the balance beam, and means enabling a three point linkage, providing a combined towing and power lift connection, to be made between the cross beam and post and an agricultural tractor.

5. A two-way plough comprising a plough frame including a box-section longitudinal central beam and a box-section cross beam secured thereto and a box-section post rising therefrom, upwardly and downwardly directed guides secured one at each end of the cross beam, two upwardly extending ploughshare supporting stalks slidable respectively in said guides in an upward and downward direction, a transverse balance beam pivoted to said post and pivotally connected on opposite sides of the post to said stalks so that one of said stalks can be raised as the other is lowered and vice-versa by angular displacement of the balance beam, a short cross lever pivoted to the lower end of each stalk, ploughshares of opposite hand secured respectively to the inner ends of said levers, an upwardly extending arm secured to the outer end of each of said levers and means for adjustably connecting each arm at or near its upper end to the stalk to enable the angular position of the ploughshare to be adjusted by adjustment of the upper end of the arm more closely to or more distantly from its stalk.

6. A two-way plough comprising a plough frame including a longitudinal central beam with forward and rearward cross beams secured thereto and forward and rearward posts rising therefrom, upwardly and downwardly directed guides one at each end of the rearward cross beam, two upwardly extending ploughshare supporting stalks slidable respectively in said guides in an upward and downward direction, a transverse balance beam pivoted to the rearward post and pivotally connected to said stalks so that one of said stalks can be raised as the other is lowered and vice-versa by angular displacement of the beam, a longitudinally extending oscillatable reversing spindle mounted on the upper ends of said posts, a reversing lever secured to the forward end of said reversing spindle, a crank on the rearward end of said reversing spindle, a crank pin on said crank, a slotted lever fixed to and extending upwardly from the mid-width of the balance beam adapted to receive said crank pin in the slot thereof so that the balance beam can be angularly displaced by operation of the reversing lever.

7. A plough according to claim 6 in which said crank is formed so as to enable it to be received in the slot of said lever rising from the balance beam and the reversing spindle is capable of limited longitudinal displacement to enable the crank to be engaged in said slot to lock the balance beam in its mid-position.

8. A two-way plough comprising a plough frame including a longitudinal central beam, a cross beam and a central post rising therefrom, upwardly and downwardly directed guides secured one at each end of the cross beam and including an upwardly extending plate lying adjacent the cross beam and rising above the cross beam and having a notch formed in its upper end, two upwardly extending ploughshare supporting stalks slidable respectively in said guides in an upward and downward direction, said stalks each having an inwardly directed pivot lug at its upper end adapted to engage in said notch in said plate when in its lowermost position, ploughshares of opposite hand secured to the lower ends of said stalks, and a transverse balance beam pivoted to said post and pivotally connected on opposite sides of said post to the pivot lugs of said stalks so that one of said stalks can be raised as the other is lowered and vice-versa by angular displacement of the balance beam.

9. A plough according to claim 8 in which the strength of the connection of the box guides to the cross beam is adequate to sustain the forces which arise in normal ploughing but insufficient to sustain the forces which might arise if the ploughshare encounters a serious obstruction whereby to allow the guide connection to yield before serious damage is sustained by the ploughshare or frame.

10. A two-way plough comprising a plough frame embodying a longitudinal central beam, forward and rearward cross beams secured thereto and forward and rearward posts rising therefrom, upwardly and downwardly directed guides one at each end of said rearward cross beam, two upwardly extending ploughshare supporting stalks slidable respectively in said guides in an upward and downward direction, ploughshares of opposite hand secured to the lower ends of said stalks, a transverse balance beam pivoted to the rearward post and pivotally connected to said stalks so that one of said stalks can be raised as the other is lowered and vice-versa by angular displacement of the balance beam, an auxiliary balance beam pivoted to said forward post and a pair of coulters disposed one on each side of the frame and connected to said auxiliary balance beam so that one of the coulters can be raised as the other is lowered and vice-versa by angular displacement of the auxiliary balance beam, and actuating means common to both balance beams for causing angular displacement of the auxiliary balance beam in timed relationship with the angular displacement of the main balance beam.

11. A plough according to claim 10 including a block on each side of the frame pivoted at its rear end to the forward cross beam, a connection from the forward end of each block to the auxiliary balance beam, an arm depending from each of said blocks, a trailing fork pivoted at its forward end to the lower end of each of said arms and a disc coulter mounted in each of said forks.

12. A plough according to claim 11 including a skim coulter secured to the fork of each disc coulter.

13. A plough according to claim 11 including a skim coulter disposed on the outside of each disc coulter and connected to the inner side of the fork of its disc coulter by a crank arm extending around the rear of the disc coulter.

14. A two-way plough arranged to be mounted at its forward end to the rear of a tractor thus avoiding the use of ground wheels at the forward end of the plough, said plough embodying a frame, towing links at the forward end of the plough frame for connection with the tractor, a power lift connection also at the forward end of the plough frame for connection with the power lift mechanism of the tractor whereby the plough can be lifted bodily off the ground by the tractor, upwardly and downwardly directed guides one on each side of the plough frame, two upwardly extending ploughshare supporting stalks slidable respectively in said guides in an upward and downward direction, and a transverse balance beam pivoted to the plough frame and connected to said stalks on opposite sides of its pivotal connection to the plough frame so that one of said stalks can be raised as the other is lowered and vice versa by angular displacement of the balance beam.

15. A two-way plough arranged to be mounted at its forward end to the rear of a tractor thus avoiding the use of ground wheels at the forward end of the plough, said plough embodying a frame, at least one ground wheel at the rear end of the plough frame, towing links at the forward end of the plough frame for connection with the tractor, a power lift connection also at the forward end of the plough frame for connection with the power lift mechanism of the tractor whereby the plough can be lifted bodily off the ground by the tractor, upwardly and downwardly directed guides one on each side of the plough frame, two upwardly extending ploughshare supporting stalks slidable respectively in said guides in an upward and downward direction, and a transverse balance beam pivoted to the plough frame and connected to said stalks on opposite sides of its pivotal connection to the plough frame so that one of said stalks can be raised as the other is lowered and vice versa by angular displacement of the balance beam.

16. A two-way plough arranged to be mounted at its forward end to the rear of a tractor so as to form the rear part thereof, thus avoiding the use of ground wheels at the forward end of the plough, said plough embodying a frame, at least one ground wheel at the rear end of the plough frame, towing links at the forward end of the plough frame for connection with the tractor, a power lift connection also at the forward end of the plough frame for connection with the power lift mechanism of the tractor whereby the plough can be lifted bodily off the ground by the tractor, upwardly and downwardly directed guides one on each side of the plough frame, two upwardly extending ploughshare supporting stalks slidable respectively in said guides in an upward and downward direction, a transverse balance beam pivoted to the plough frame and connected to said stalks on opposite sides of its pivotal connection to the plough frame so that one of said stalks can be raised as the other is lowered and vice-versa by angular displacement of the balance beam and means at the forward end of the plough for effecting said angular displacement of the balance beam, said means being accessible from the tractor driver's seat without the driver dismounting.

17. A two-way plough arranged to be mounted at its forward end to the rear of a tractor, thus avoiding the use of ground wheels at the forward end of the plough, said plough embodying a frame, towing links at the forward end of the plough frame for connection with the tractor, a power lift connection also at the forward end of the plough frame for connection with the power lift mechanism of the tractor whereby the plough can be lifted bodily off the ground by the tractor, upwardly and downwardly directed guides one on each side of the plough frame, two upwardly extending ploughshare supporting stalks slidable respectively in said guides in an upward and downward direction, a transverse balance beam pivoted to the plough frame and connected to said stalks on opposite sides of its pivotal connection to the plough frame so that one of said stalks can be raised as the other is lowered and vice-versa by angular displacement of the balance beam, ploughshares of opposite hand carried respectively at the lower ends of the stalks, and means for adjusting the angular position of the ploughshares relative to the stalks to suit different depths of cut.

CHARLES WILLIAM EVANS.

REFERENCES CITED

The following references are of record in the file of this patent:

UNITED STATES PATENTS

| Number | Name | Date |
| --- | --- | --- |
| 1,171,479 | Tracy | Feb. 15, 1916 |
| 1,207,430 | Nilson | Dec. 5, 1916 |
| 1,603,993 | Stark | Oct. 19, 1926 |

FOREIGN PATENTS

| Number | Country | Date |
| --- | --- | --- |
| 242,915 | Germany | Jan. 26, 1912 |